United States Patent [19]
Apostolos

[11] Patent Number: 4,506,485
[45] Date of Patent: Mar. 26, 1985

[54] PROCESS FOR INHIBITING CORROSION OF METAL EMBEDDED IN CONCRETE AND A REINFORCED CONCRETE CONSTRUCTION

[75] Inventor: John A. Apostolos, Sacramento, Calif.

[73] Assignee: State of California, Department of Transportation, Sacramento, Calif.

[21] Appl. No.: 484,305

[22] Filed: Apr. 12, 1983

[51] Int. Cl.³ .............................................. B27K 1/00
[52] U.S. Cl. ..................................... 52/515; 204/147; 204/196; 52/741; 405/211; 405/216
[58] Field of Search ................ 204/147, 196; 428/450; 405/211, 216; 52/169.14, 515

[56] References Cited

U.S. PATENT DOCUMENTS

| | | | |
|---|---|---|---|
| 1,898,864 | 2/1933 | Young | 52/515 |
| 2,890,157 | 6/1959 | Raetzsch | 204/196 |
| 3,130,520 | 4/1964 | Newman | 52/515 |
| 3,151,050 | 9/1964 | Wilburn | 204/196 |
| 3,475,304 | 10/1969 | Currey | 204/147 |
| 3,498,898 | 3/1970 | Bogart | 204/196 |
| 3,769,521 | 10/1973 | Caldwell | 405/211 |
| 4,196,064 | 4/1980 | Harms | 204/147 |
| 4,255,241 | 3/1981 | Kroon | 204/196 |

Primary Examiner—Henry E. Raduazo
Attorney, Agent, or Firm—Lothrop & West

[57] ABSTRACT

Electrically conductive metal is melted, preferably by a flame, and is sprayed onto a freshly exposed, pitted surface of a concrete member having iron embedded therein. The sprayed metal, when cooled, forms a metal cover on and interlocked with at least part of the newly exposed surface. The cover and the embedded iron are preferably joined in an electric circuit affording a direct current electromotive force, effectively opposite to that which normally would occur, in order to preclude the deterioration of the contained iron.

9 Claims, 3 Drawing Figures

PROCESS FOR INHIBITING CORROSION OF METAL EMBEDDED IN CONCRETE AND A REINFORCED CONCRETE CONSTRUCTION

BRIEF SUMMARY OF THE INVENTION

Corrosion of metal, such as iron (reinforcing steel) embedded in concrete having a surface exposed to moist, saline air is inhibited by removal of a superficial part of the surface of the concrete, preferably by sandblasting or the like, to provide a newly exposed surface and then by promptly spraying forcibly, as by flame-spraying, a molten conductive metal onto the just-exposed surface in order to afford a cover on the concrete. In many instances the reinforcing metal and the covering metal are included in a direct current electric circuit counterbalancing deterioration of the iron.

PRIOR ART

Patents known to the applicant and having some pertinence to this disclosure are as follows:

| | | |
|---|---|---|
| 2,866,742 | 3,766,032 | 4,196,064 |
| 3,047,478 | 3,992,272 | 4,255,241 |
| 3,475,304 | 4,173,523 | |

None of the foregoing is particularly concerned with the problem of arranging an evenly distributed nearly perfect (low) electrolytic connection between the reinforcing metal and the coating metal. None is concerned with appropriate steps to provide such a good connection.

DETAILED DESCRIPTION

Figure 1:
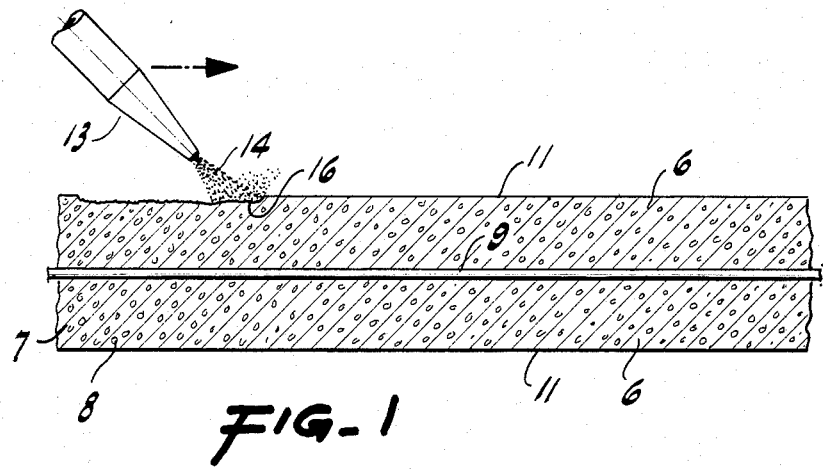
FIG. 1 is a diagrammatic view in cross-section showing an initial sandblasting or surface preparation step.

It is a widespread practice to utilize cement concrete for structures. Most of these require reinforcement by included stiff materials strong in tension, such as reinforcing shapes or members almost universally of a ferrous origin, particularly iron or steel bars. The concrete is somewhat pervious to surrounding water and to the atmosphere. Particularly when the surroundings or atmosphere are marine, or otherwise contain saline material, the structure is subject to erosion or corrosion of the metal largely by an electrolytic action. On the short term this may not be serious, but over a long period the integrity of the structure is substantially compromised. It is therefore a great advantage to provide an effective means for reducing or even eliminating the electrolytic action and thus to preserve the integrity of the metal reinforcement and of the whole structure.

In ordinary exposure of the structural concrete, the surface thereof tends to wear away or to be disintegrated by spalling, cracking, dusting and general superficial failure. This aggravates the problem of penetration of corrosive materials to the contained steel (or iron) reinforcing materials.

In accordance with this invention, there is postulated a typical construction embodying a concrete structure 6 of the usual description, including aggregates 7, sand and Portland cement 8 or the like. Such structure encloses a reinforcing shape or bar 9 usually of metal especially of a ferrous material such as steel and has exposed surfaces 11 subject to substantial deterioration, use and wear.

Pursuant to the present invention, the first step in reducing the customary corrosion of the reinforcement 9 is to prepare or to treat the surface 11 by removing the exposed portion thereof. This is variously done, preferably by a sandblast gun 13 ejecting a stream 14 of grit or sand particles or the like against the surface 11. This dislodges and displaces weathered concrete or surface or exposed concrete which has been mechanically abraded or loosened or has disintegrated by atmospheric effects or the like. This first step leaves a surface 16 freshly exposed to the atmosphere and has a roughened, pocked or irregular surface affording what is referred to as "tooth". That is to say, newly exposed surface has depressions or even partly closed pits or a matte finish after the sandblasting has been completed and the sand has been removed. The surface 16 is clean after the sandblasting operation and is fresh in that it has not theretofore been exposed directly to the ambient conditions, especially to the atmosphere.

Promptly following the sandblasting operation and preferably before there has been time for any substantial deterioration in the new surface 16, there is deposited on such new surface a coating or layer 18 of a molten metal. This is often zinc although it can be of some other conductive metal.

The molten or liquified metal is preferably discharged with substantial velocity from a conventional metallizing gun which sprays the metal in finely divided particle form from a nozzle 19 or the like so as to provide a flame deposit. The flame-spray mechanism used is such as to propel and deposit the metallic spray on the just-prepared surface 16 and is directed to afford an evenly distributed layer. The effect is that the finely divided metal in spray form can enter and interengage with all the interstices and pits and depressions in the freshly prepared surface 16. The metal can interlock or interengage therewith with considerable intimacy so that conduction of an electric current between the metal and the adjacent prepared concrete is very good. Even minor currents can easily flow since there is virtually no resistance. The metal 18 can be laid down either as a sheet that is continuous when cool and solid, or in discrete strips or areas adjacent the reinforcement bar 9 or the like.

When the deposition of the metal layer 18 has been completed, the layer is permitted to cool and solidify, any resulting shrinkage assisting in even more tightly interlocking the metal layer and the rough, contacting concrete. To the layer there may then be connected by a conductor 21 a source 22 of direct current also connected by a conductor 23 to the reinforcing bar 9. The aim is to provide a flow of electrical current between the metallic layer 18 and the reinforcing bar 9 by reason of the battery or other direct current source, substantially equal and opposite to the current which would result between the various surface areas of bar 9 and/or other metals or bars electrically connected to bar 9. Since the imposed or impressed current is opposite and equal to the naturally occurring current, the net result is very little or no electrolytic action on the reinforcing bar, which therefore maintains its integrity over a long period.

In some instances it is not necessary to have an external source 22 of direct current because the simple establishment of a metal connection between the surface 16 and the bar 9 is adequate if the surface 18 is composed of a metal which is higher in the electromotive series than the reinforcing metal; although under most circumstances and particularly under severe ambient conditions, the provision of a direct current source is advisable whether by battery or other means, such as a generator.

In various practical instances and in numerous tests, it has been discerned that by first affording a clean, fresh surface 16 by removal of the normally occurring exterior surface 11 to dissipate old material and to leave a pitted, freshly prepared surface, the metal coat or layer is able to unite intimately therewith and to afford a greatly improved electrical continuity.

Although the metal 18 is preferably deposited on the surface 16 to a thickness in the range of 0.010" to 0.030", unusually servere conditions, such as constant exposure to a moist saline environment, may require a thicker coating than 0.030"; and while the metal is customarily laid down as a continuous sheet, some types of reinforced concrete structures are adequately protected by applying the metal in a square gridwork pattern. For example, a gridwork having a band width of 6" and a 6" spacing between the bands has been used to economic advantage.

Figure 2:
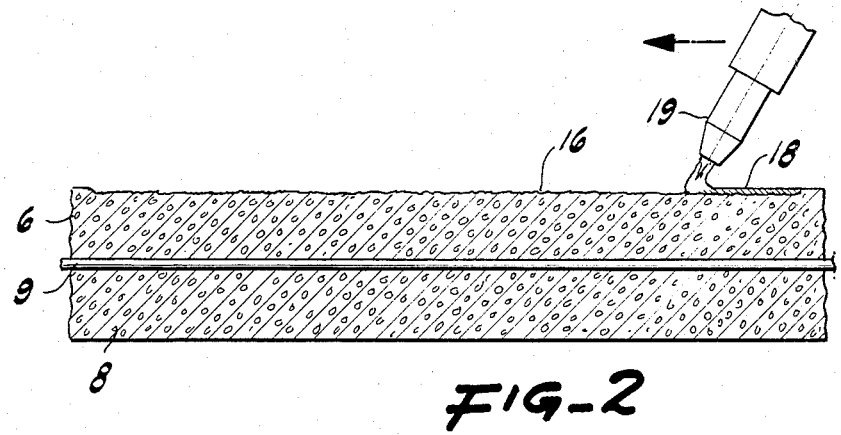
FIG. 2 is a similar diagrammatic view in cross-section showing the application of an appropriate metallic coating to the just-prepared concrete surface by a stylized "flame-sprayer".
Figure 3:
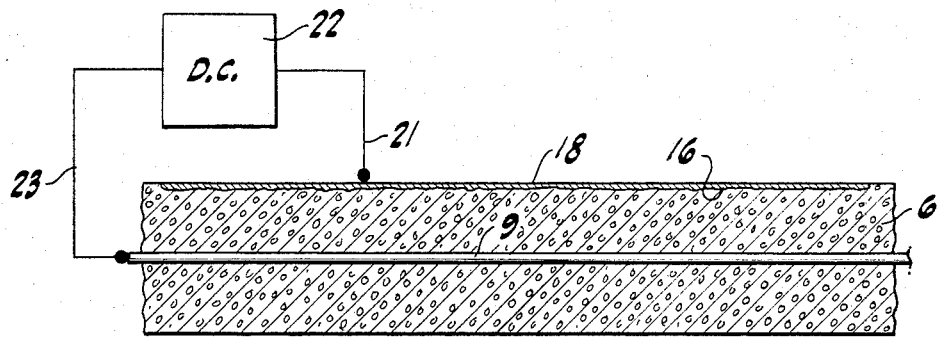
FIG. 3 is a diagram showing in similar cross-section the finished arrangement including a source of electricity.

The process has many applications. Thus, the reinforcing bar 9 in FIGS. 1–3 could be any of the conventional steel reinforcing shapes or it could be a steel wire cable tensioning member in any pre-cast, pre-tensioned concrete structure, such as a girder or beam.

Still other applications in which cathodic protection is afforded by the process include cooling towers and reinforced concrete tanks pre-tensioned by steel bands or wires and coated with a layer of concrete. Quite frequently, oil refineries and chemical plants are located adjacent an arm of the sea in which case corrosive electrolytic forces are present, capable of damaging the numerous concrete-covered, pre-tensioned storage tanks associated with all such installation.

I claim:

1. A process for inhibiting corrosion of iron embedded in concrete wherein the concrete has an exterior exposed to a moist, saline environment comprising sandblasting said exterior to remove the existing surface thereof and to leave a newly exposed surface thereon, then promptly flame-spraying a metal onto at least part of said newly exposed surface, to form a cover thereon, and then connecting said cover and said iron in a circuit containing a source of electricity.

2. A process as in claim 1 in which said cover is an electrically conductive metal.

3. A process as in claim 1 in which said iron acts as a cathode in said circuit and said cover acts as an anode in said circuit.

4. A process as in claim 1 in which said source of electricity furnishes direct current.

5. A process as in claim 1 in which said cover is formed on said exterior before said exterior has been substantially deteriorated by exposure to said environment.

6. A concrete structure reinforced with an interior iron bar and having an external surface that has been substantially unexposed to the atmosphere, a cover of flame-sprayed metal on said surface and disposed between said surface and the atmosphere, and means for subjecting said cover and said iron bar to a current opposing deterioration of said bar.

7. A concrete structure reinforced with a pre-tensioned interior member of ferrous material and having an external surface that has been substantially unexposed to the atmosphere, a coating of flame-sprayed metal on said surface and disposed between said surface and the atmosphere, and means for subjecting said coating and said ferrous member to a current opposing deterioration of said member.

8. A structure as in claim 7 in which the concrete is pre-cast and said ferrous member includes at least one steel wire cable.

9. A structure as in claim 7 in which said ferrous member is a pretensioned reinforced concrete tank.

* * * * *